March 8, 1932.  W. F. FOLMER ET AL  1,848,614
ELECTRICAL INSECT EXTERMINATOR
Filed July 2, 1931  5 Sheets-Sheet 1
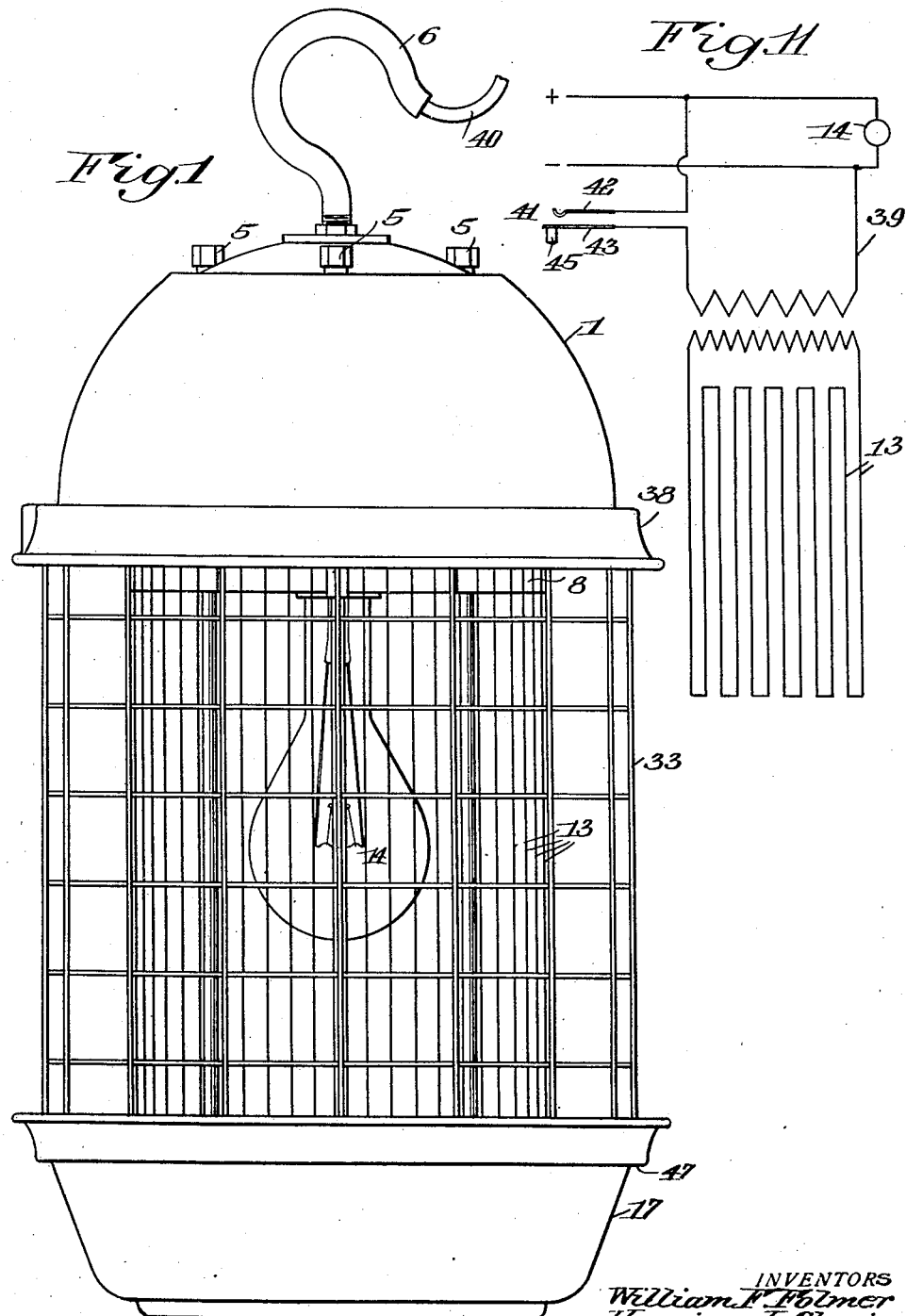

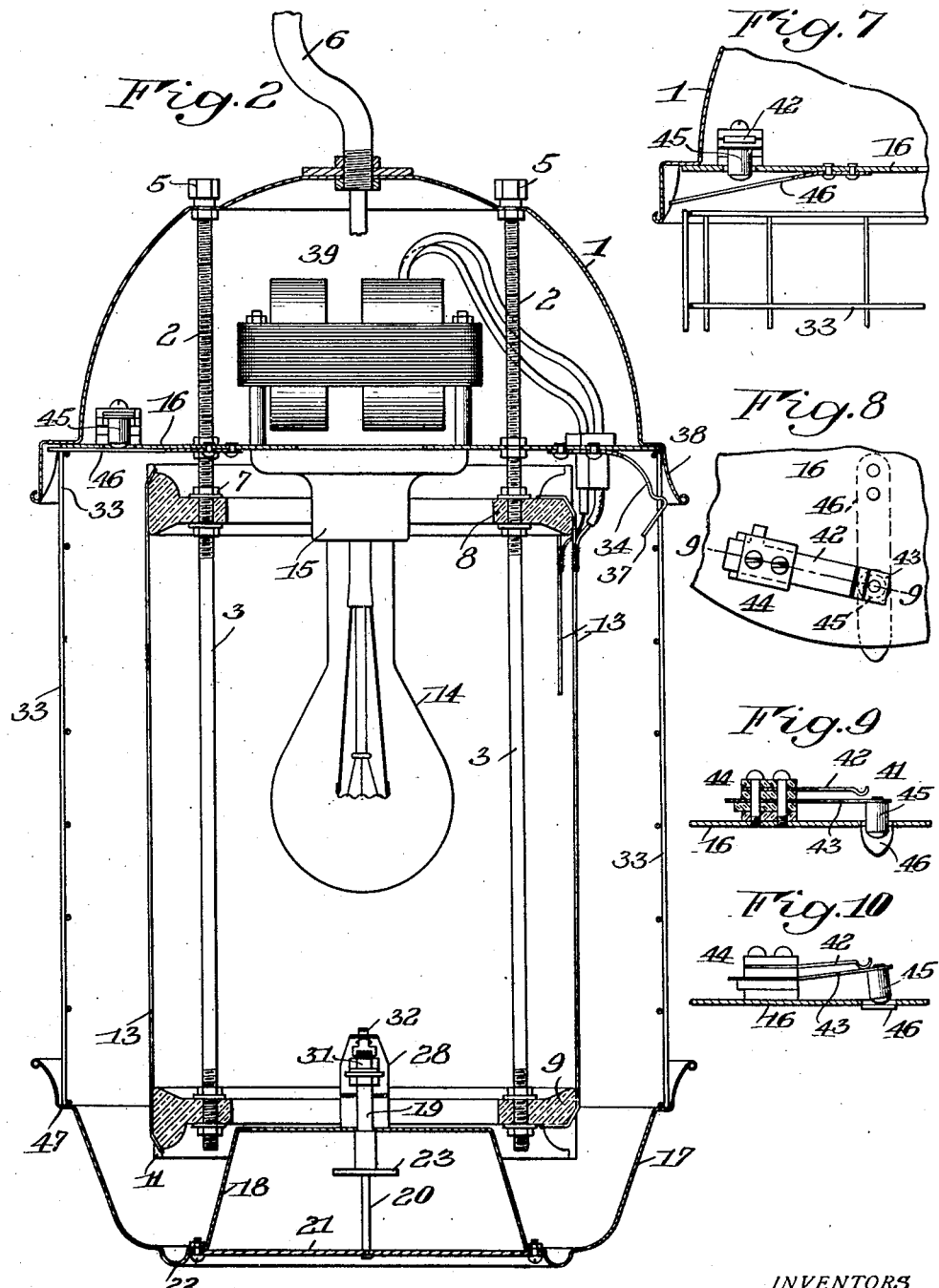

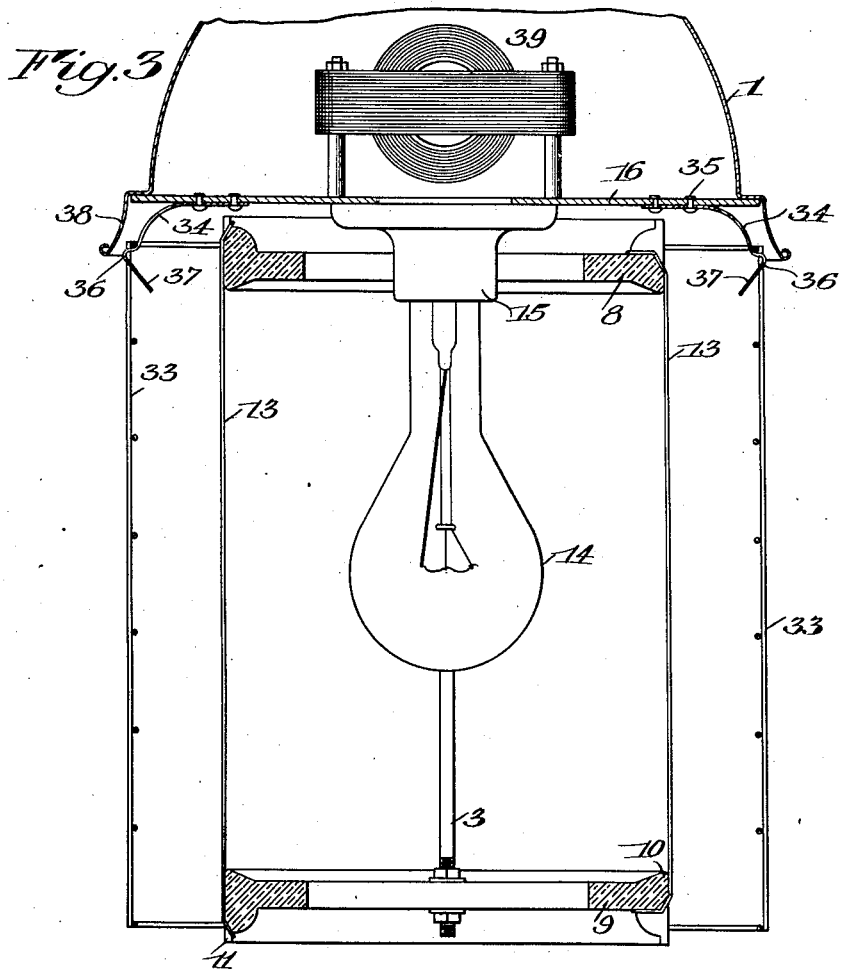
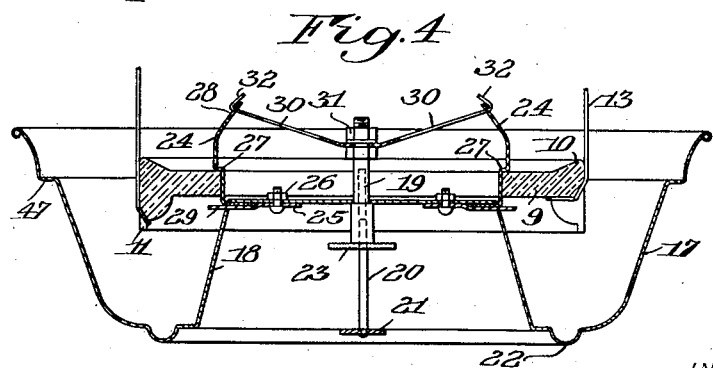

March 8, 1932.  W. F. FOLMER ET AL  1,848,614
ELECTRICAL INSECT EXTERMINATOR
Filed July 2, 1931   5 Sheets-Sheet 4

INVENTORS
William F. Folmer
Harrison L. Chapin
BY
Their ATTORNEY

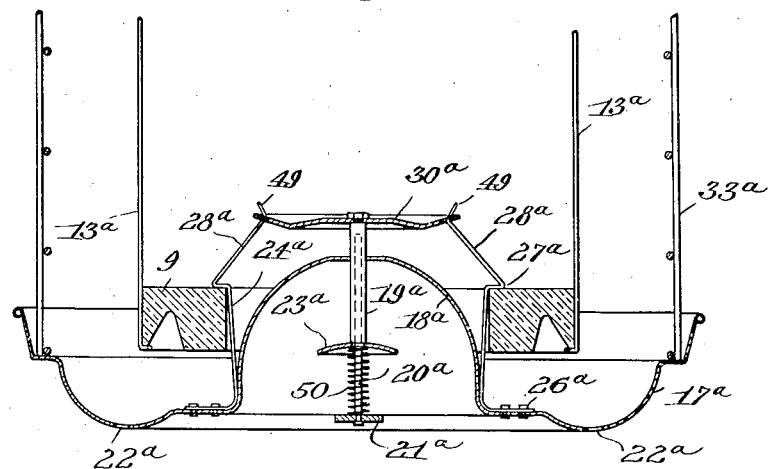
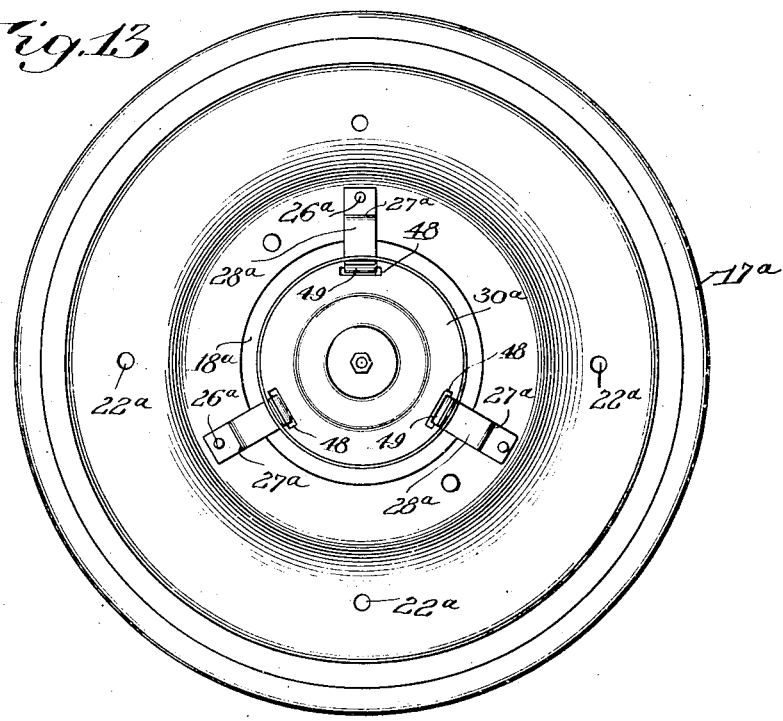

Patented Mar. 8, 1932

1,848,614

UNITED STATES PATENT OFFICE

WILLIAM F. FOLMER AND HARRISON L. CHAPIN, OF ROCHESTER, NEW YORK, ASSIGNORS TO FOLMER-CHAPIN CORPORATION, OF ROCHESTER, NEW YORK, A CORPORATION OF NEW YORK

ELECTRICAL INSECT EXTERMINATOR

Application filed July 2, 1931. Serial No. 548,336.

Our present invention relates to electrical devices and has for its object to provide a simple, attractive and safe high voltage means adapted for use on ordinary lighting circuits for destroying insects by electrocution, or incineration, particularly night-flying insects injurious to vegetation. The improvements are directed in part toward the arrangement of a lamp, by the illumination of which the insects are attracted to the device and come in contact with the charged wires, which latter, however, cannot become dangerous to a person manipulating the lamp itself. Lures of another nature are contemplated in place of the lamp. The improvements are also directed toward making provision for catching the insects that are killed and toward safeguarding the user by the manipulation of this means, automatically, in cleaning the exterminator.

To these and other ends, the invention resides in certain improvements and combinations of parts, all as will be hereinafter more fully described, the novel features being pointed out in the claims at the end of the specification.

In the drawings:

Fig. 1 is a front elevation of an insect exterminator constructed in accordance with and illustrating one embodiment of our invention;

Fig. 2 is a vertical central section therethrough leaving certain interior parts in elevation;

Fig. 3 is a vertical central section through the body of the device taken on a plane at right angles to that of Fig. 2 and with the top portion broken away;

Fig. 4 is a similar section through the catch pan, detached;

Fig. 7 is an enlarged fragmentary section through the circuit closer shown in Fig. 2, but in open position;

Fig. 8 is a fragmentary top plan view of the circuit closer and its mounting;

Fig. 9 is a fragmentary section through the circuit closer taken on the line 9—9 of Fig. 8;

Fig. 10 is a side elevation of the circuit closer in another position;

Fig. 11 is a diagrammatic view of the electric circuit connections;

Fig. 12 is a fragmentary vertical section through the pan and adjacent elements corresponding to Fig. 4, but showing a modified construction, and Fig. 13 is a top plan view of the modified pan, detached.

Similar reference numerals throughout the several views indicate the same parts.

Figure 5:
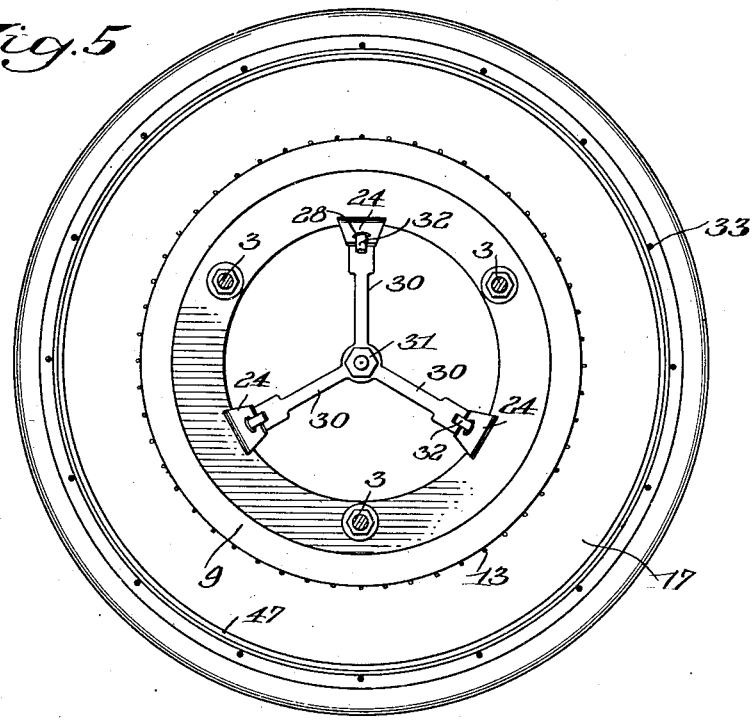
Fig. 5 is a horizontal section through the body portion, showing the catch pan in top plan.

This invention involves the general construction of and constitutes an improvement upon the subject matter of our copending application, Serial No. 513,272, filed February 4, 1931, and as stated therein, the invention is concerned, in general, with an insect exterminating device, in which the killing influence is exerted by high tension electric wires or circuits in the form of a cage, against which the insects, such as moths, beetles, mosquitoes, flies, et cetera, are induced to collide through the provision of a light or other lure arranged within this high tension cage. It preferably has the general form of a lantern that may be suspended from trees, porches of houses and other available places, but which may also be set out on the lawn, if desired, for the same general purposes. It operates usefully in most any outdoor spot, but its particular utility is in protecting fruit trees, taking the place of the usual spraying but with much more effective results. In such a case, the orchard is wired, for instance, with the usual 120 volt line which, through a transformer preferably built into the device, is built up to a voltage sufficiently high to cause the electrocution or incineration of the winged insects. The highly charged conductors, within the zone of which the insects are attracted by the lure, are so protected as to shield birds and human operatives from dangerous contact therewith, and in accordance with the present invention, the removal of the shield breaks the tension of the high tension current, so that the destroying influence is removed therewith. This result may be accomplished whether or not a pan, so disposed as to catch the body of the destroyed insects, is removed with the safety barrier or not, thus permitting the exterminator to be used in cases where it is not desired to collect the bodies of the insects, but to permit them to fall to the ground.

In both our previous application referred to and in the present one, the purpose of collecting the remains of the insects is either to identify the species for scientific purposes or to prevent them from littering the area below, as in the case of the disposition or arrangement of the device within the living quarters of human habitations.

Referring more particularly to the drawings, 1 indicates a preferably semi-spherical cap or top piece to which are secured at their upper threaded ends 2 a plurality (in the present instance, three) of standards, supports or connecting members 3. The said threaded ends 2 and the cap 1 are secured together by lock nuts 5 and a suitable connection, such as a hook 6, is affixed to the apex or dome of the cap 1 from which the device is suspended when desired, as, for instance, in hanging the exterminator from fruit trees or supporting lines in an orchard. Secured in vertical spaced relationship to the supports 3 by lock nuts 7 are upper and lower insulating or dielectric rings 8 and 9. These rings are preferably of the contour shown in section in Figs. 3 and 4, and outer circumferential flanges 10 thereof are pierced by shallow radial slots 11. Looped about the projections formed by these slots are the strands 13 of the high tension or high voltage wire, the strands being preferably substantially parallel and spaced apart a distance sufficient to bring the charged zones surrounding them in the proper proximity to cause a winged insect to receive through its anatomy the killing voltage with which the wires are charged through means hereinafter described.

The attraction for these night-flying, injurious and pestilent insects exists, in the present embodiment, in an illuminant housed within the cage formed by the high tension strands 13, but other lures, such as molasses, cut fruit, meat or other foods, attractive to the particular type of insect sought, may be used in place of the light. In the present instance, this light is provided in the form of the ordinary filament electric light bulb 14 supported in a central socket 15 depending from a mounting plate or stage 16 supported above the ring 8 on the connecting standard 3. The dome 1 is flanged, as shown, to rest upon this stage 16 and is secured to it. The lamp 14 is accessible for manipulation through the bottom of the cage by reaching up through the lower ring 9 and correspondingly the dead insects fall through the bottom of the device, though usually from the outside of the cage.

Figure 6:
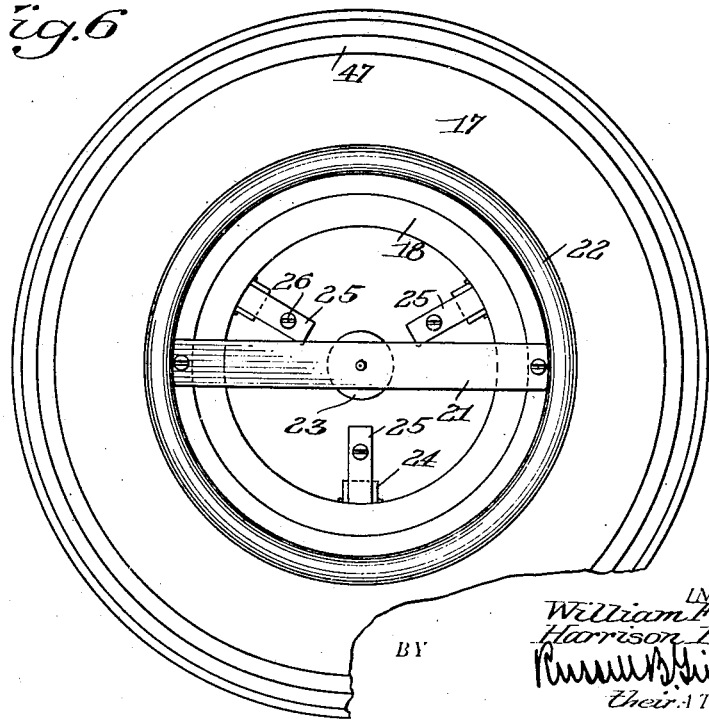
Fig. 6 is a bottom view of the catch pan.

When it is desired to catch the insect bodies, I provide in the embodiment shown in Figs. 4, 5 and 6 a preferably flat bottom pan 17 detachably connected to the bottom of the device, the flat bottom facilitating the support of the exterminator on the ground or floor instead of in a hanging position. The pan also has a reentrant portion in its bottom constituting a dome 18 and slidable vertically in the top of this dome to project both above and below it is a tubular pull rod 19 guided on a post 20 supported on a cross bar 21 secured to the bottom of the pan above a bead 22 which defines the plane of the ground line contact. Below the top of the dome, the pull rod carries a finger piece 23, which may be conveniently operated to draw the rod downwardly by grasping the cross piece 21 that constitutes a handle.

A plurality of spring catches 24 extend upwardly at intervals from the periphery of the dome 18 and they have horizontal portions 25 secured thereto as by the bolts 26. The vertical portions of the catches are bent or formed to provide locking shoulders 27 and inclined deflecting portions 28, while projecting tongues 29 secured by the same bolts 26 provide stop shoulders. Both the tongues and the catch plates, of course, project through openings provided at corresponding points in the dome. When it is desired to attach the pan to the body of the device, it is thrust upwardly thereon so that the catches 28 slip through the central opening of the lower insulating ring 9 and as their inclined portions 28 engage the same, they are deflected inwardly, so that the shoulders 27 ultimately lock on top of the ring, as shown in Fig. 4, the stops 29 limiting the upward movement. To release the catches in detaching the pan, the finger piece 23 is drawn downwardly, whereupon radial straps 30 secured centrally to the draw bar 19 by clamping nuts 31 and hooked into eyes in the upper ends of the several catches 24 at 32 draw them inwardly and simultaneously disengage them.

The means provided, in the present instance, for shielding both birds and humans from accidental contact with the high tension wires consists of a guard 33 in the form of a wire grille that is cylindrical and supported in spaced relationship to the high tension cage 13. As best shown in Fig. 3, this is suspended from the underside of the stage 16 by means of spring catches or clips 34 riveted to the stage at 35 and having shoulders 36 associated with inclined deflecting portions 37 much the same in character as the catches 24 below. The tension of these spring clips is such that they are readily displaced when the guard 33 is shoved up over them and also readily yield when it is pulled down to detach it, but in the meantime they are sufficiently stiff to support the guard, in the manner shown in Figs. 7 and 3, with its upper rim beneath an eave-like flange 38 depending from the dome 1.

As heretofore stated, our device is designed to operate upon the ordinary 120 volt lighting circuit, and as also heretofore stated, it seems desirable in consequence of our developments that the voltage in the wires 13 should approximate 3500. While the electrocution of humans is conducted with a voltage of somewhere around 2100, it seems that the anatomy of insects, contributed particularly by the structure of their wings, is dielectrically greater. It is, therefore, necessary to step up the ordinary line voltage, which act we accomplish through the use of a transformer incorporated in the device. This transformer is indicated generally at 39 in Figs. 2 and 3. The suspending hook 6 on the dome 1 is preferably made tubular to receive and form a conduit for the line wire 40 which feeds both the transformer and the direct 120 volt circuit through the lamp 14 in accordance with the diagram of Fig. 11, in which it is shown that the wires 13 constitute the induction field of the transformer 39. Complete explanation of the circuits shown in this diagram is thought unnecessary, except to the extent of pointing out a switch or circuit breaker 41 in the circuit of the transformer, individually, that opens the circuit thereof when the pan 17 is removed and the guard 33 lowered from the position of Fig. 2 to that of Fig. 3.

This circuit breaker is best shown mechanically and in detail in Figs. 7 to 10. Two spaced spring contact members 42 and 43 in the circuit of the line wire 40 are suitably supported on the stage 16 in an insulated block 44. The lower one 43 is provided with a button 45 which projects through an aperture in the stage in proximity to a leaf spring 46 normally held detracted and out of contact therewith when the guard 33 is removed or the pan 17 is removed, as in Fig. 3, to allow the guard to drop down on the spring catches 36, as shown in Fig. 7. When, however, the pan is replaced, and the catches 27 engage, the cage 33, resting on rim 47 of the pan, is raised into contact with the stage at the top flattening out the spring finger 46 secured to the underside of the stage. This pushes upwardly upon button 45 carrying yielding member 43 into contact with contact member 42 above it, closing the circuit through both the lamp 14 and the transformer and energizing the wires in cage 13. It is obvious, therefore, that when the pan is again detached, conversely, both the lamp is de-energized and the induction from the transformer to the wires 13 is destroyed, rendering the electric cage inert. In other words, the absence of the light indicates that there is no danger from high tension wires.

Referring to our previous statement regarding the use of the device without the pan, this is ordinarily dangerous, as a person might attempt to reach the lure of whatever nature by thrusting his hand up through the lower ring 9 without removing the guard or shield 33 and burn himself, but in the case of professional users or those intimately familiar with the structure, this may be done. In such a case, the only modification required is to stiffen the catches 34 so that they will hold the guard 33 sufficiently close to the underside of the stage to maintain the weaker spring finger 46 raised and the contact members 42 and 43 in circuit.

As before stated, Figs. 12 and 13 show a modified construction of pan and attaching devices therefor, whereby there is associated therewith a platform or support upon which is displayed the lures other than the light and which may be used with or without the latter. This construction embodies the same general elements and mode of operation, and the corresponding parts have been lettered with the same numerals accompanied by the exponent "a". There are these differences: The dome 18$^a$ is rounded and the catches 24$^a$ are riveted at 26$^a$ to the bottom 17$^a$ of the pan at the base of the dome. The shoulders 27$^a$ of the catches engage as usual upon the upward interlocking movement of the pan, but no stops similar to the stops 29 are necessary, as will be seen from a view of the construction. The pull rod 19$^a$, instead of being connected at its upper end to spring straps 30, is secured to a preferably circular dish-shaped rigid platform 30$^a$ having slots 48 in its margins. The upper hooked ends 49 of the cam portions 28$^a$ of the catches 24$^a$ engage through these slots.

When the pull rod 19$^a$ is drawn down by means of the finger piece 23$^a$, also drawing down the rigidly connected pan support 30$^a$, the latter slides on the inclined cam portions 28$^a$ of the catches and draws them toward the center, releasing the locking shoulders. The spring action for returning the pull rod 19$^a$ to normal raised position and allowing the catches to remain engaged supplied by the spring connections 30 in the structure of Fig. 4 is provided in the form of a spring 50 encircling the base of the post 20$^a$ and acting between the finger piece 23$^a$ and the cross piece 21$^a$.

With the removal of the pan, the platform or support 30$^a$ is free and accessible for the disposition thereon of the lure or bait at a distance from the electrified elements.

We claim as our invention:

1. In an insect electrocuting device, the combination with upper and lower insulating supports, of conductors extending longitudinally between them in spaced relationship to form a cage, high tension circuit connections for the conductors, a guard surrounding the cage, a pan supporting the bottom of the guard but detachable therefrom and from the cage, and a circuit breaker for the high tension circuit controlled by the position of the guard.

2. In an insect electrocuting device, the combination with upper and lower insulating supports, of conductors extending longitudinally between them in spaced relationship to form a cage, high tension circuit connections for the conductors, a guard surrounding the cage, a pan supporting the bottom of the guard but detachable therefrom and from the cage, and a circuit breaker for the high tension circuit controlled by the position of the pan through the guard.

3. In an insect electrocuting device, the combination with a support embodying upper and lower insulating elements, and conductors extending longitudinally between the elements in spaced relationship to form a cage, of high tension circuit connections for the conductors, a guard surrounding the cage, means for movably connecting it to the support, a circuit breaker for the high tension circuit actuated by the movement of the guard, and a pan detachably engaging the bottom of the support and controlling the movement of the guard.

4. In an insect electrocuting device, the combination with a support embodying a stage and upper and lower insulating elements beneath the latter, of conductors extending longitudinally between the elements in spaced relationship to form a cage, a high tension circuit connection for the conductors, a guard surrounding the cage and movable longitudinally relatively to the cage, and a circuit breaker mounted on the stage and controlled by the movement of the guard.

5. In an insect electrocuting device, the combination with a support embodying a stage and upper and lower insulating elements beneath the latter, of conductors extending longitudinally between the elements in spaced relationship to form a cage, a high tension circuit connection for the conductors, a guard surrounding the cage and movable longitudinally relatively to the cage, a circuit breaker for the high tension circuit carried on the stage, and a removable pan at the bottom of the support cooperating with the guard to close the circuit breaker when the pan is put in place.

6. In an insect electrocuting device, the combination with a support embodying spaced upper and lower insulating rings, conductors extending longitudinally between them in spaced relationship to form a cage, and high tension circuit connections for the conductors, of a catch pan provided with catches occupying the interior of the lower ring and engaging the latter to detachably support the pan, and a manually operable device on the underside of the pan for simultaneously releasing the catches.

7. In an insect electrocuting device, the combination with a support embodying spaced upper and lower insulating rings, conductors extending longitudinally between them in spaced relationship to form a cage, and high tension circuit connections for the conductors of a catch pan having a reentrant bottom provided with catches occupying the interior of the lower ring and engaging the latter to detachably support the pan, and a manually operable device arranged within the cavity of the reentrant bottom for releasing the catches.

8. In an insect electrocuting device, the combination with a support having vertically disposed conductors in spaced relationship to form a cage, and high tension circuit connections for the conductors, said support having a centrally open bottom portion, of a catch pan provided with catches extending into the said central opening and engaging the bottom to support the pan, and a manually operable device on the underside of the pan for releasing the catches.

9. In an insect electrocuting device, the combination with a support having vertically disposed conductors in spaced relationship to form a cage, and high tension circuit connections for the conductors, said support having a centrally open bottom portion, of a catch pan having a reentrant bottom provided with catches occupying the interior of the opening in the bottom of the support and engaging the latter to detachably support the pan, and a manually operable device arranged within the cavity of the reentrant bottom for releasing the catches.

10. In an insect electrocuting device, the combination with a support having vertically disposed conductors in spaced relationship to form a cage, and high tension circuit connections for the conductors, said support having a centrally open bottom portion, of a catch pan having catches thereon engaging the bottom of the support through the opening therein, and a lure-holding element supported by the catches.

11. In an insect electrocuting device, the combination with a support having vertically disposed conductors in spaced relationship to form a cage, and high tension circuit connections for the conductors, said support having a centrally open bottom portion, of a catch pan having spring catches thereon engaging the bottom of the support through the opening therein, a lure-holding element supported by the catches, and means on the underside of the pan for operating the lure-holder to release the catches.

12. In an insect electrocuting device, the combination with a support embodying spaced upper and lower insulating elements, conductors extending longitudinally between them in spaced relationship to form a cage, and high tension circuit connections for the conductors, of a catch pan provided with a plurality of catches cooperating with the bottom of the support, and a common manually operable means for releasing the catches.

13. In an insect electrocuting device, the combination with a support embodying spaced upper and lower insulating elements, conductors extending longitudinally between them in spaced relationship to form a cage, and high tension circuit connections for the conductors, of a catch pan having a reentrant bottom provided with spring catches, and a releasing means for the catches arranged within the cavity provided by the reentrant portion of the bottom.

14. In an insect electrocuting device, the combination with a support embodying spaced upper and lower insulating elements, conductors extending longitudinally between them in spaced relationship to form a cage, and high tension circuit connections for the conductors, of a catch pan having a reentrant bottom provided with spring catches, and a releasing means for the catches arranged within the cavity provided by the reentrant portion of the bottom and comprising a pull rod extending through the bottom and connected to spring the catches, said pull rod being provided with a finger piece and a bridge piece spanning the cavity provided with a guide post upon which the pull rod slides.

WILLIAM F. FOLMER.
HARRISON L. CHAPIN.